United States Patent
Pengg

(10) Patent No.: US 12,515,929 B2
(45) Date of Patent: Jan. 6, 2026

(54) CHAIN DRIVE COMPRISING DOUBLE CHAIN WHEEL, SLING DEVICE, AND CHAIN DRIVE SYSTEM

(71) Applicant: Pewag Austria GmbH, Kapfenberg (AT)

(72) Inventor: Ägyd Pengg, Klagenfurt (AT)

(73) Assignee: Pewag Austria GmbH, Kapfenberg (AT)

(*) Notice: Subject to any disclaimer, the term of this patent is extended or adjusted under 35 U.S.C. 154(b) by 251 days.

(21) Appl. No.: 17/901,047

(22) Filed: Sep. 1, 2022

(65) Prior Publication Data
US 2023/0091350 A1    Mar. 23, 2023

(30) Foreign Application Priority Data
Sep. 23, 2021  (EP) .................................... 21198589

(51) Int. Cl.
*B66D 3/26*     (2006.01)
*B66D 1/30*     (2006.01)
*F16H 55/30*    (2006.01)

(52) U.S. Cl.
CPC ............... *B66D 3/26* (2013.01); *B66D 1/30* (2013.01); *F16H 55/303* (2013.01)

(58) Field of Classification Search
CPC .... B66D 1/26; B66D 1/30; B66C 1/10; F16H 55/303
See application file for complete search history.

(56) References Cited

U.S. PATENT DOCUMENTS

| | | | | | |
|---|---|---|---|---|---|
| 3,596,879 | A | * | 8/1971 | Clark | B66D 3/26 |
| | | | | | 254/389 |
| 2013/0109520 | A1 | * | 5/2013 | Klabisch | B65G 19/20 |
| | | | | | 474/164 |
| 2024/0351095 | A1 | * | 10/2024 | Tobin | B23K 11/02 |

FOREIGN PATENT DOCUMENTS

| | | | | | |
|---|---|---|---|---|---|
| CN | 104418234 | A | * | 3/2015 | B66C 1/34 |
| CN | 109052137 | A | * | 12/2018 | B66C 1/02 |

(Continued)

OTHER PUBLICATIONS

Search Report for European Patent Application No. 21198589.0 dated Apr. 5, 2022 (6 pages).

*Primary Examiner* — Anna M Momper
*Assistant Examiner* — Nathaniel L Adams
(74) *Attorney, Agent, or Firm* — Eversheds Sutherland (US) LLP

(57) ABSTRACT

A chain drive for chain hoist with two link chains including two chain wheels arranged adjacent on a shaft and in torque-proof connection to one another, each chain wheel being used to guide a section of link chain having alternately horizontal and vertical links, namely, with pockets for accommodating horizontal links and with a groove extending in the circumferential direction for accommodating vertical links. The chain wheels have a fixed angular offset smaller than the angular pitch between two successive chain links of a chain wheel. This chain drive forms a chain drive system together with a sling for two link chains running parallel, wherein the sling includes, at one end, a connecting part for a load and, opposite thereto, two adjacently arranged connection portions for respective end links of either link chain, wherein the connection portions are offset from one another along the load direction with a linear offset smaller than the chain pitch along the load direction.

20 Claims, 10 Drawing Sheets

(56) References Cited

FOREIGN PATENT DOCUMENTS

| | | | | | |
|---|---|---|---|---|---|
| DE | 4104985 | A1 | | 8/1992 | |
| DE | 4201974 | A1 | * | 7/1993 | ............... B66D 3/26 |
| EP | 0499814 | A2 | | 8/1992 | |
| FI | 106304 | B | * | 1/2001 | ............... B66D 3/26 |
| GB | 716999 | A | * | 10/1954 | ............... B66D 3/22 |

* cited by examiner

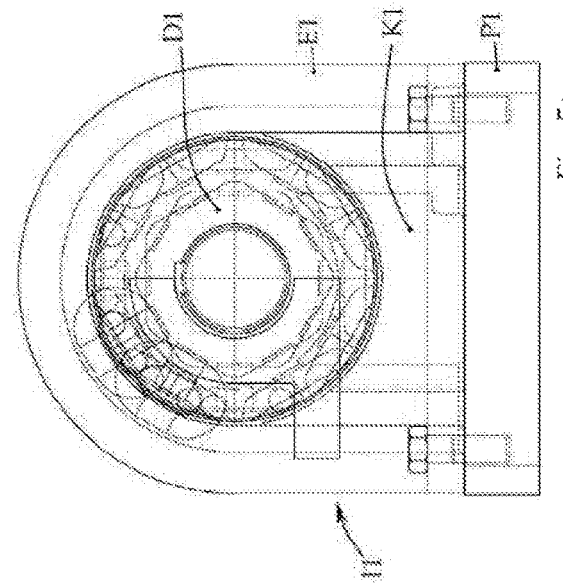
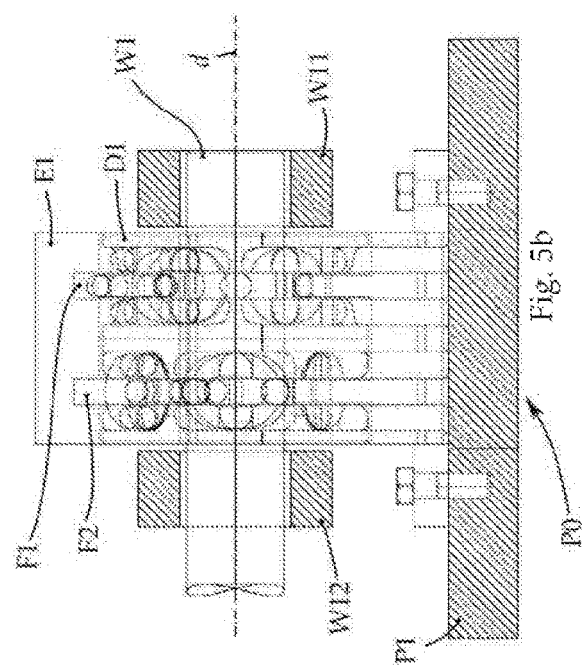
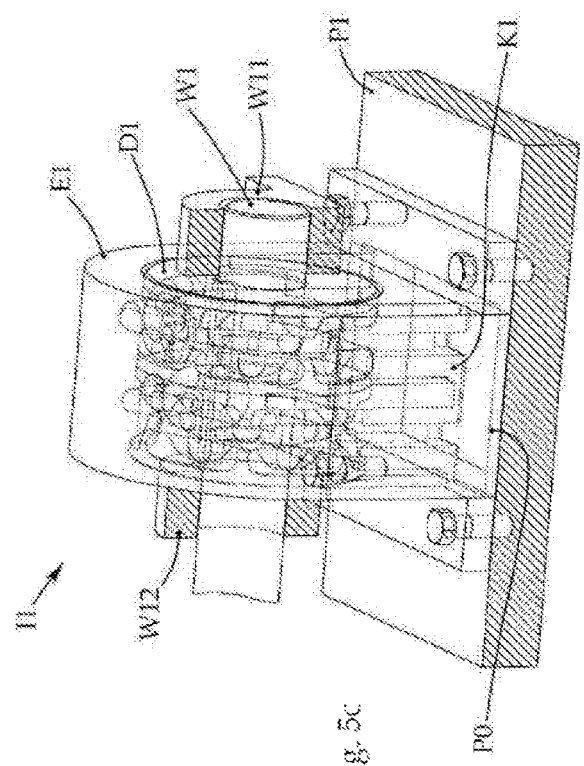
Fig. 5a
Fig. 5b
Fig. 5c

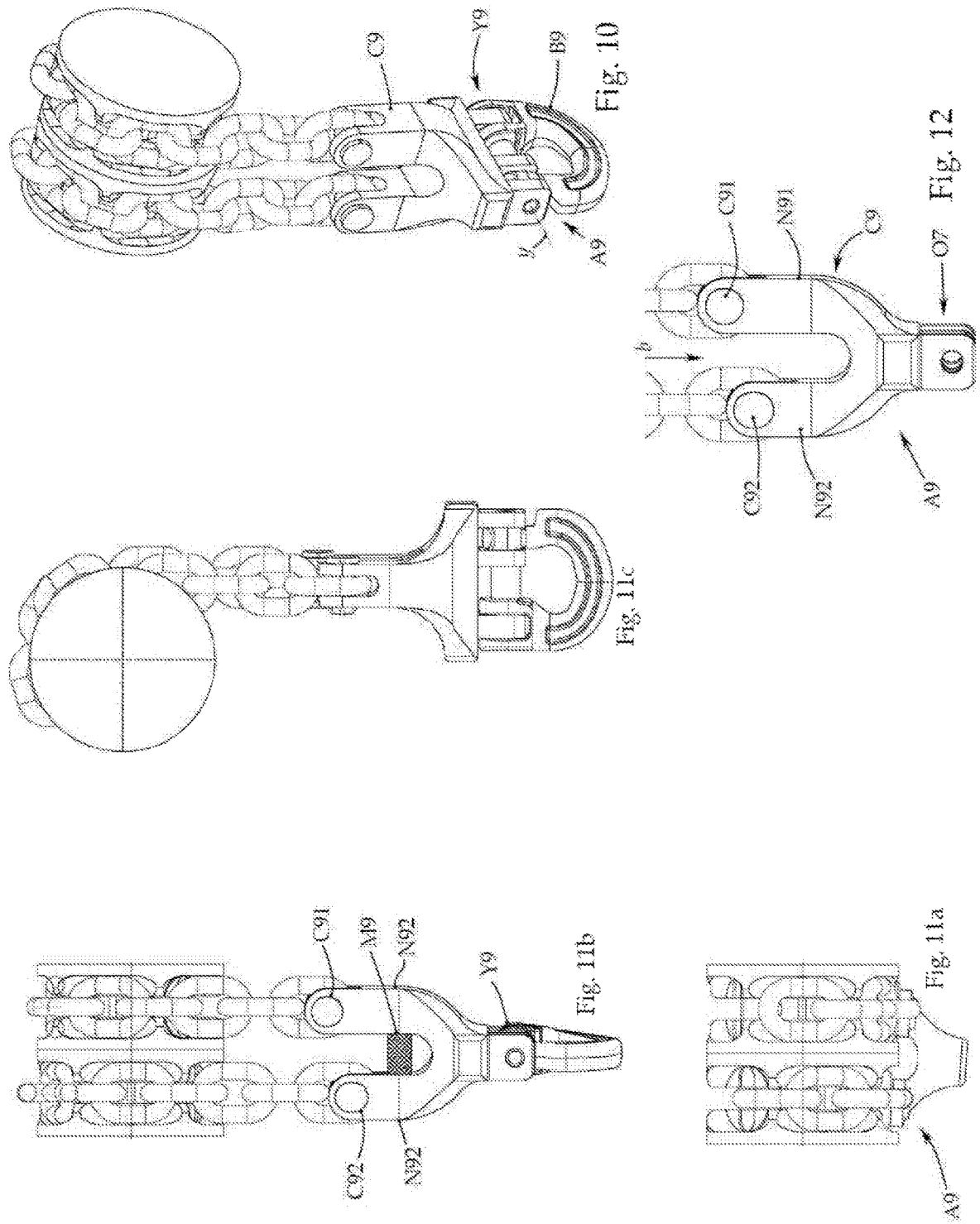

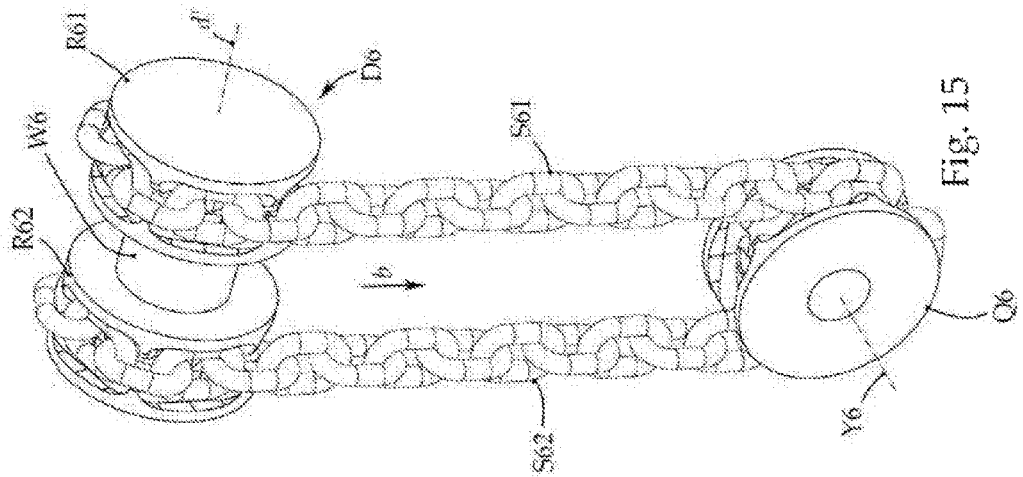
Fig. 15
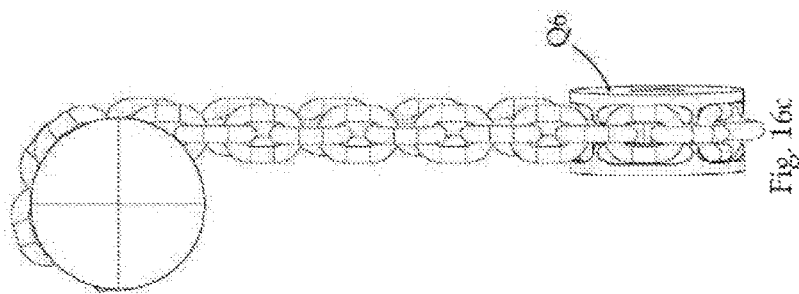
Fig. 16c
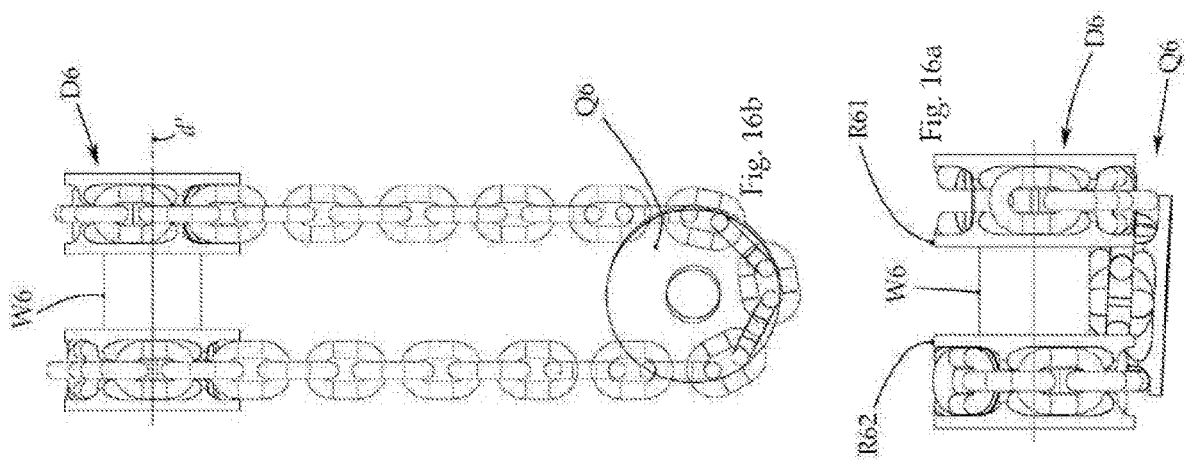
Fig. 16a
Fig. 16b

CHAIN DRIVE COMPRISING DOUBLE CHAIN WHEEL, SLING DEVICE, AND CHAIN DRIVE SYSTEM

This application claims priority to European Patent Application No. 21198589.0, filed Sep. 23, 2021, which is incorporated herein by reference.

The invention relates to a chain drive with a doubled chain wheel for a chain hoist in which more than one link chain is used as carrying means. In particular, the invention relates to a chain drive for a chain hoist which comprises two or more link chain strands, which in particular includes the case of two link chains as well as the case of a double link chain, wherein the chain drive comprises two or more chain wheels which are arranged adjacent to one another on a shaft of the chain drive and in a torque-proof connection to one another, wherein each chain wheel is configured for guiding a respective section of a link chain having alternately horizontal and vertical links. For this purpose, the chain wheels have pockets for accommodating horizontal chains and a groove extending in the circumferential direction for accommodating vertical links.

The invention further relates to a sling device for a chain suspension with two link chain strands running parallel, wherein the sling device is designed in relation to a provided load direction and comprises at one end a connecting part for a load and at an opposite end to this, when viewed in the load direction, two adjacently arranged connection portions for respective end links of either link chain strand. The invention also relates to a chain drive system for a chain hoist having two (or more) link chain (strands) which comprises a sling device according to the invention and/or a chain drive according to the invention.

A chain hoist is a lifting tool, wherein chain links, in particular industrial round steel chains or profile steel chains, are used as carrying means for the lifting and/or movement of loads. Therein the chain links of a chain strand are guided over a chain wheel (also called chain nut), wherein the links of the chain strand are alternately oriented vertically and horizontally on the outer surface of the chain wheel. Also known is the simultaneous guiding of two chains via a chain drive which includes a double chain wheel. Such a configuration can be seen, for example, in FIG. 20 showing a double chain wheel DO according to prior art, together with a symbolic diagram of several chain links of two chain strands which are each guided over one of the two chain wheels. The chain links are oriented alternately vertically and horizontally on the respective chain wheel.

A known problem with chain hoists with link chains is the polygon effect. This comprises a rhythmic swinging of the load chain hoist when pulling in the chain, which is produced by the different effective radii of the chain on the tension roller. In extreme cases the chain can vibrate up to the resonance frequency.

It is an object of the invention to overcome the said disadvantages of known double chain wheels. In particular, the polygon effect should be reduced as far as possible.

This object is achieved by a chain drive in which, according to the invention, a first chain wheel is "twisted" with respect to a second chain wheel, i.e. it has a fixed angular offset (greater than 0°, for example, at least 5°) which is smaller than the angular pitch between two successive chain links of the first chain wheel. The angular pitch can be determined in the chain wheel as half the angle between successive chain pockets.

By virtue of this comparatively simple measure, one achieves a surprisingly efficient reduction of the polygon effect by at least half a single chain wheel. The polygon effect, which is unavoidable in a single-strand chain hoist, is significantly reduced thanks to this solution. As a result of the load distribution over two chain strands, the temporarily different radial deflections of the two chain strands can compensate for one another to a high degree.

In particular it has been shown that with regard to the reduction of the polygon effect favourable values of the angular offset are at approximately half an angular pitch. More generally the angular offset should preferably be no less than half an angular pitch. An angular offset whose value is above half an angular pitch is, for reasons of symmetry, equivalent to the relevant complement in relation to twice the angular pitch. A favourable range for the angular offset V for an expedient reduction of the polygon effect is in particular approximately $U_1/3 \leq V \leq 5U_1/6$, preferably $U_1/2 \leq V \leq 2U_1/3$, wherein $U_1$ denotes the angular pitch.

Although not absolutely necessary, it may often be advisable that the chain drive additionally has a housing which surrounds the chain wheels and delimits the movement space of the chain links on the chain wheels in the radial direction on its inside. The housing may have two adjacent grooves on the inside in which vertical links of the link chain strands running on the chain wheels are guided. This makes it possible to delimit the movement space of the horizontal links in the housing in a favourable manner.

The chain wheels may abut directly against one another, possibly even be in one piece, or may be spaced apart from one another on the shaft; in the latter case the shaft may have a region between the chain wheels with reduced diameter (cf. FIG. 17). Thus, the chain wheels are adjacent, possibly connected by a connecting shaft, but without interposed components such as transmission or drive components.

The mentioned object is further achieved by a sling device of the type mentioned initially and a chain drive system for a chain hoist which includes two (or more) link chain (strands)—herein, two or more chain strands may also be sections of the same link chain which is then guided multiply—and which comprises this sling device and a chain drive according to the invention; therein the connection portions in the sling device are arranged offset with respect to one another along the load direction, and specifically with a linear offset which is smaller than the chain pitch along the load direction.

For the connecting part numerous configurations are feasible. In particular, the connecting part may include a sling bracket, which may be attached in a fixed connection, but preferably is pivotable, usually about an axis transverse to the load direction, wherein this axis preferably lies in the plane in which the link chain strands run, or transversely to this plane. The connecting part may, however, also have an opening for connection of the load. This may be an eye for instance. The opening may also comprise an internal thread. The eye or opening may be oriented transversely to the load direction and preferably transversely to the plane in which the link chain strands run. Alternatively or in combination, the connecting part may comprise a load hook; this hook may preferably be mounted on the sling device in a rotatable manner about an axis parallel to the load direction.

In order to further reduce the effect of the movement between the chain strands, it may be favourable to have each connection portion arranged on a leg extending in the load direction (or a small angle thereto, e.g. <45°), wherein an intermediate element of deformable material is arranged between the legs, for damping vibrations between chains attached at the connection portions. The intermediate element may, for example, be configured as a block of elastomeric material and/or as a hydraulic damper element.

A chain drive system for a chain hoist with two link chain strands or a double link chain may, thus, according to the invention comprise a chain drive as mentioned above and a sling device as mentioned above.

Instead of a sling device in the narrower sense, a chain hoist may be provided with a chain wheel that is inserted in a doubled link chain. This will result in a chain drive system with a chain drive as already mentioned, in particular with spaced apart chain wheels as well as a chain deflecting wheel which is configured as a chain wheel; then the axis of this chain deflecting wheel can then be configured for fastening a load.

The invention together with further details and advantages will be explained in detail hereinafter with reference to several exemplary embodiments which are shown in the drawings and are merely exemplary and not restrictive for the invention. The drawings show schematically:

FIGS. 5a-5c show a lifting gear arrangement which includes the chain drive of FIG. 4 in a front view (FIG. 5a), a side view (FIG. 5b) and a perspective view (FIG. 5c);

FIG. 10 shows a chain drive system with a sling according to a further exemplary embodiment;

FIGS. 11a-11c show the chain drive system of FIG. 10 in a plan view (FIG. 11a), a front view (FIG. 11b) and a side view (FIG. 11c);

FIG. 12 shows a front view of the sling of FIG. 10;

FIG. 15 shows a chain drive system with a chain drive component having chain wheels spaced apart from one another and a chain deflecting wheel, according to a further exemplary embodiment;

FIGS. 16a-16c show the chain drive system of FIG. 15 in a plan view (FIG. 16a), a front view (FIG. 16b) and a side view (FIG. 16c);

FIG. 20 shows a double chain wheel without angular offset according to prior art.

Figure 1:
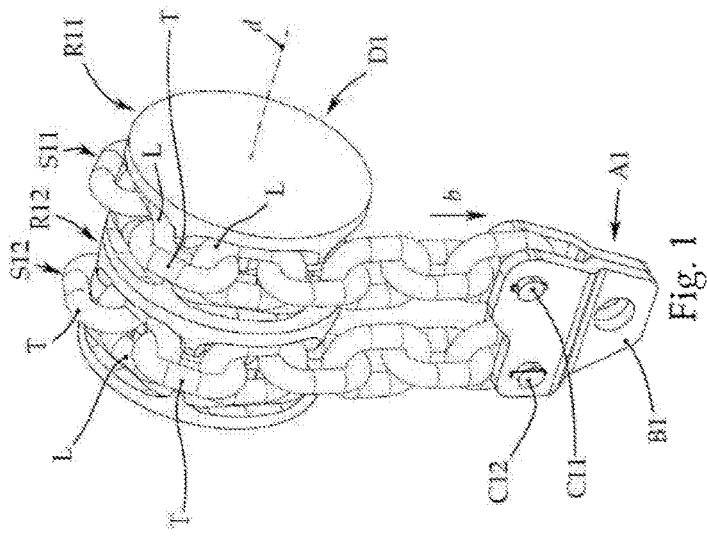
FIG. 1 shows a perspective view of a chain drive system with a double chain wheel and a first sling according to a first exemplary embodiment.

In the figures same elements are provided with same reference numerals for reasons of better clarity. The reference numerals in the claims merely serve the purpose of better understandability and do not constitute any restriction for the respective embodiments in any case. Exemplary embodiments are shown in the drawings wherein—not to be interpreted as restrictive for the invention—a load is carried against the force of gravity, and therefore the load direction b (see FIG. 1) agrees herein with the vertical; however, it is obvious that in other applications the load direction may also be differently oriented such as during the transport of a load along a track wherein the load direction then usually corresponds to the running direction of the path. Generally the chains which are used as load means in the chain hoist run substantially symmetrically along the load direction in the loaded operating state. Terms such as "upper part", "lower" or "underside" should be understood in this sense, namely with reference to an orientation according to a vertically imaginary load direction.

The exemplary embodiments presented herein relate to chain drives which are designed for round steel chains in which the individual chain links are arranged with respect to one another by 90° about the running direction of the chain. The chains may also be chain lines of different shape, such as profile steel chains, and the person skilled in the art can readily perform adaptations of the chain wheels according to the invention and chain drive systems as suitable for chains of these types. The chains are usually made of steel such as case-hardened steel, but quenched and tempered steel is also used.

When a link chain is guided over a chain wheel of a chain drive according to the invention, the individual chain links are held thereon alternately as vertical T and horizontal links L (see, for example, FIG. 1) on the respective chain wheel and guided in this way. The terms "vertical" and "horizontal" used here have the meaning which is conventional in the art: a vertical chain link T is a chain link that is supported at (only) one leg. The eye of a vertical chain link on the chain wheel is oriented substantially parallel to the axis of rotation of the chain wheel. On the chain wheel this leg of the vertical chain link is frequently located in a groove of the chain wheel, which extends in the circumferential direction and determines the position of the chain link. A horizontal chain link L is a chain link having both legs rest on the chain wheel, next to each other. The eye of a horizontal chain link on the chain wheel is oriented substantially radially in relation to the axis of rotation of the chain wheel. In the chain wheels considered here chain pockets are usually provided which each accommodate a horizontal chain link.

Figure 2C:
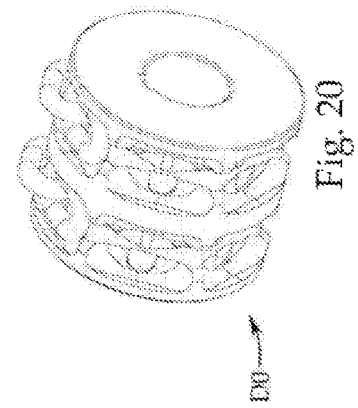
FIGS. 2a-2c show the chain drive system of FIG. 1 in a plan view (FIG. 2a), a front view (FIG. 2b) and a side view (FIG. 2c)
Figure 2C:
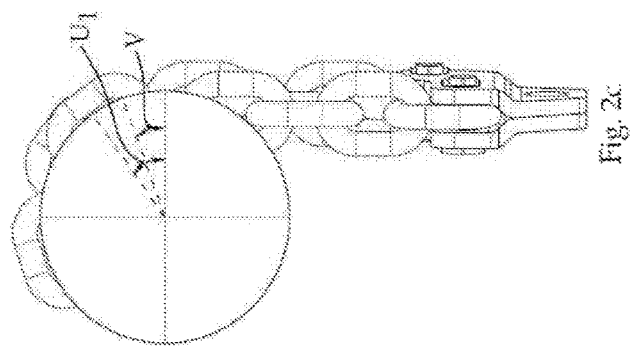
Figure 2B:
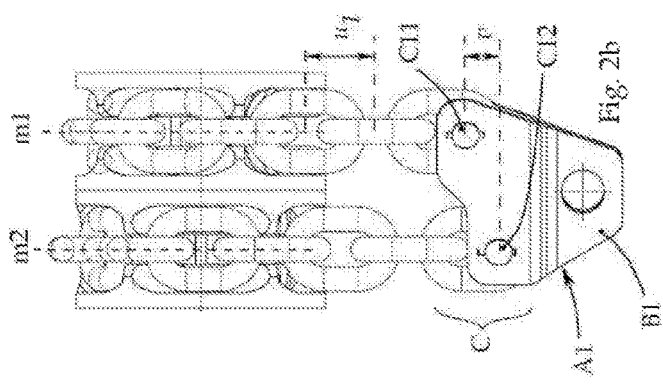
Figure 2A:
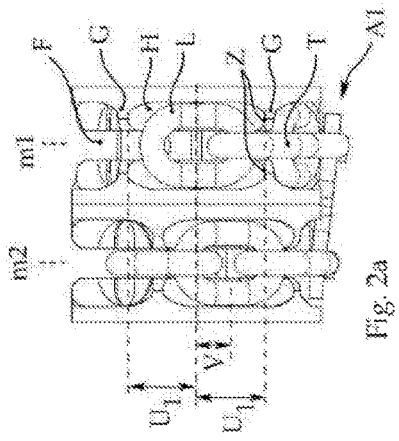

FIG. 1 shows a perspective view of a chain drive system with a chain drive in the form of a double chain wheel D1 according to a first exemplary embodiment, together with two chain strands S11, S12 of a chain hoist guided thereon; furthermore, at the ends of the chain hoist a sling (sling device) realized as a sling component A1 is fixed. FIGS. 2a-2c show the chain drive system in three views, namely in a plan view (FIG. 2a; viewing direction along the load direction b), a front view (FIG. 2b) and a side view (FIG. 2c;

viewing direction parallel to the axis of rotation d of the chain wheel). In FIGS. 1 2a-2c, the chain drive is shown without a housing so that the chain wheel and the chain strands guided thereon are more easily visible; the housing E1 is optional and is explained further below with reference to FIGS. 5a-5c and 6a-6d.

As can be seen in FIGS. 1 and 2a-2c, the two chain strands S11, S12 are respectively guided around the two chain wheels R11, R12 of the double chain wheel D1, the individual chain links being supported alternately as vertical links T and horizontal links L on the respective chain wheel R11, R12, and being guided in this way.

Each of the chain wheels R11, R12 is configured as a so-called pocket chain wheel. It accordingly has pockets H which are adapted to the oval shape of the links and which have a substantially planar contact surface (pocket base) for each horizontal chain link L. Furthermore, recesses may be formed along the longitudinal centre of the pockets, serving to accommodate any welding bulge (not shown) around a leg of the chain link so that the chain link L can rest flat on the contact surface of the pocket H even in the presence of such a welding bulge. The pockets of the chain wheel are delimited with respect to one another by webs G wherein each web is divided by a groove F for accommodating the vertical links T in the central plane m1, m2 of the chain wheel R11, R12; thus, a web G is divided into two teeth Z (in each case on the left and right of the central plane m1 or m2). In the present exemplary embodiment the chain wheel has a pentagonal shape in side view, with five pockets H and accordingly five webs G delimiting them; however, it will be clear that a chain wheel may readily have a larger or smaller number of pockets and webs. The webs G have convex flanks which at their "inner" (i.e. nearest to the axis of rotation d) edge go over directly into the planar contact surfaces of the pockets H, preferably with a pronounced transition edge. In the base of the grooves F for the vertical links T, preferably configured to be flat, an indentation may additionally be made between the teeth Z which serves the same purpose as the afore-mentioned recess in the pocket base, namely to accommodate any welding bulge (not shown) of the vertical link T so that this can rest flat with the planar outer side of its inner leg on the groove base or can be supported thereon. The supporting of the vertical links T on the groove base of the groove F is actually of great importance for the function of the chain drive or wheel since, during the process of settling in, the horizontal links L themselves are supported on the vertical links T, thus facilitating the pivoting motion of the horizontal chain links onto the respective pocket bases in the correct position. As a result of this configuration of the chain wheel, both the horizontal links L and also the vertical links T are supported flat, namely the horizontal links L with a large proportion of their side surfaces on the contact surface of the pockets and the vertical links T with the outer surface of the inner-lying leg on the groove base.

In the double chain wheel D1 the two chain wheels R11, R12 are adjacent and connected to one another coaxially in a torque-proof manner. According to the invention, the chain wheels have an angular offset greater than 0° with respect to one another, i.e. the chain pockets of the one chain wheel R11 are located in a different angular position from the chain pockets of the other chain wheel R12, when viewed along the axis of rotation d. This can also be related to the webs G in an equivalent manner, i.e. the webs G of one chain wheel R11 are located in a different angular position to the webs G of the other chain wheel R12 when viewed along the axis of rotation d. This angular offset is designated with V in FIGS. 2a-2c, and in the embodiment of FIGS. 1 and 2a-2c it is about 18°, which corresponds to half the angular pitch $U_1$ of the chain on the pentagonal chain wheel.

In general the invention proposes that the angular offset V is smaller than the angular pitch $U_1$. The angular pitch $U_1$ on a chain wheel is definable as the angular difference between a chain pocket H and one of the webs G which delimit this chain pocket, as measured, for example, by means of radius rays which extend through the centre point of the chain pocket or the web (cf. FIG. 2c). Equivalent to this, the angular pitch $U_1$ is half the angular difference between each two successive chain pockets H (or webs G) of the same chain wheel; as a result, two successive chain links T, L on the chain wheel have an angular distance with respect to one another which corresponds to the angular pitch $U_1$. According to the invention $0<V<U_1$, wherein preferably $V \geq U_1/2$, as will be discussed in further detail below.

The load is connected at the ends of the two chain strands by means of a sling (sling device) which in each case has a connection portion for the two chain strands, wherein these connection portions are arranged offset with respect to one another along the load direction, namely by an offset which is smaller than the chain pitch along the load direction.

In the exemplary embodiment shown in FIGS. 1 and 2a-2c, the sling is configured as a sling component A1, also referred to as sling rocker A1. The sling rocker A1 is made of two stamped shaped plates of steel, e.g. case-hardened steel or quenched and tempered steel which are formed mirror-symmetrically with respect to one another and are welded together in the region of the connecting part B1. The sling rocker comprises two sections: a connecting section C (i.e., the upper part in FIGS. 1 and 2b), where the two shaped plate parts diverge in a fork-shaped manner, and the already-mentioned connecting part B1 (i.e., the lower part of the sling component in FIGS. 1 and 2b). The fork-shaped connecting section is provided for connection of respectively one end link of the two link chains which are accommodated in the intermediate space of the fork shape; and for this purpose it has two connection portions C11, C12. In the exemplary embodiment shown each connection portion has a pair of mutually opposite holes through which it is possible to insert a bolt. For connection of a chain the end link of the chain is put into the intermediate space of the fork, the bolt is inserted through the holes and secured with split pin. In the exemplary embodiment of FIGS. 1 and 2a-2c the connecting part B1 is configured with an eye, allowing connecting a hook into its opening or attaching another sling means to which the load is fastened. Thus, the eye of the connecting section B1 is oriented transversely to the load direction and, preferably, also transversely to the plane in which the link chains run. Alternatively or in combination with the eye, a threaded hole (not shown) may also be provided, i.e. an opening with an internal thread which allows, preferably on both sides, insertion or screwing-in of a sling means (e.g. a rod for fastening). The threaded hole is also oriented transversely to the load direction and may run transversely to the plane in which the link chains run or lie in this plane.

In general, the sling has, on the side opposite the connecting part, two connection portions for each end link of each link chain, arranged next to each other; these connection portions are arranged offset with respect to one another along the load direction, namely by a linear offset v which differs from zero (that would be the conventional "same height") which is smaller than the chain pitch $u_1$ along the load direction. The linear offset v is related to the angular offset V via the average radius r of the chains on the chain wheels, V=v/r.

As a result of the load distribution on two chain strands which are offset with respect to one another by an angular offset V where $0<V<U_1$, (corresponding to a linear offset v where $0<v<u_1$) and the use of a compensating rocker, the temporally varying radial deflections of the two chain strands are largely compensated. This is illustrated in FIG. 3.

Figure 3:
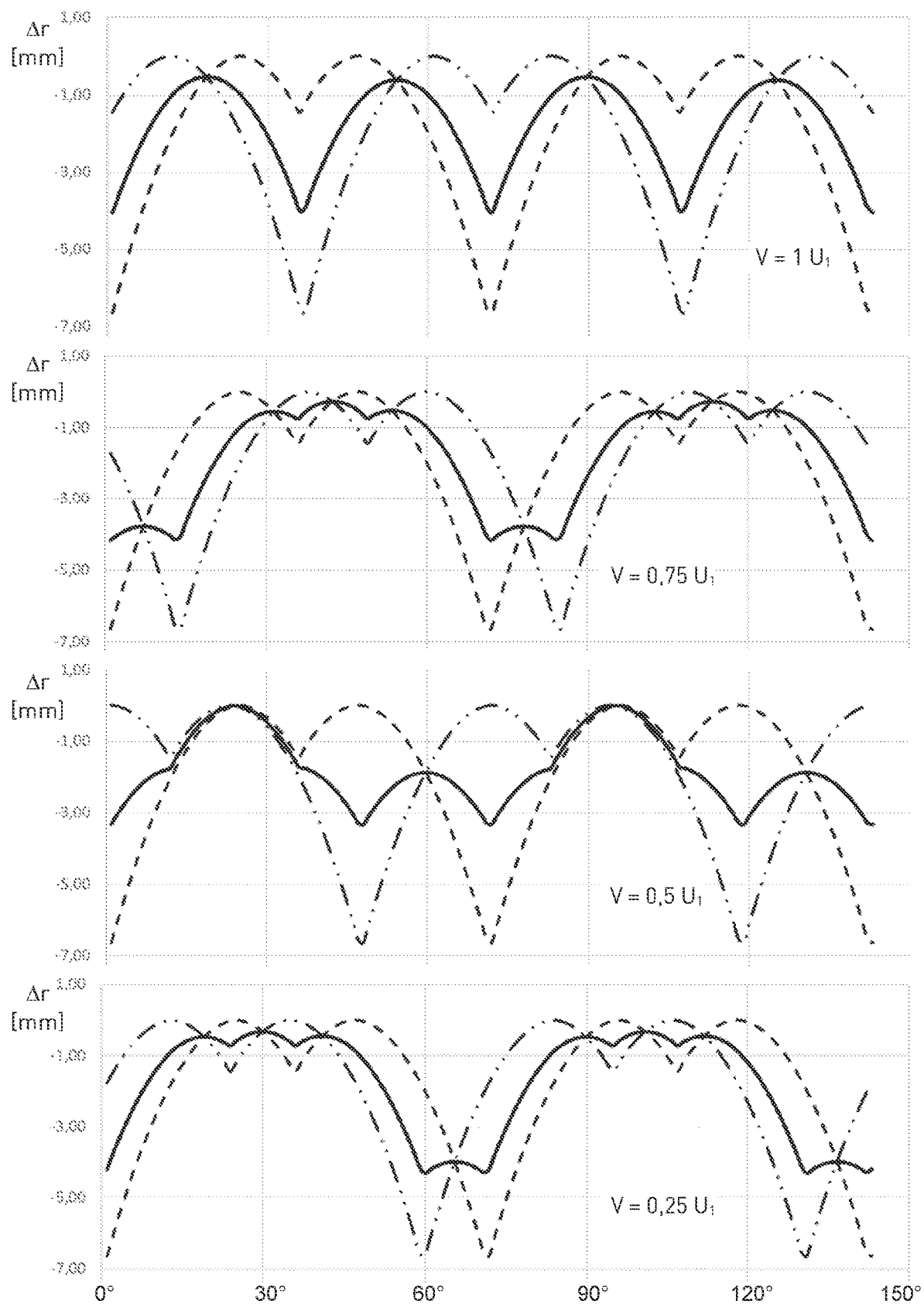
FIG. 3 illustrates how the averaged chain radius is dependent on the angle during a rotation of a chain wheel, for four different values of the offset.

FIG. 3 illustrates the dependence of the average chain radius on the angle in the course of a rotation of a chain wheel, namely, in four diagrams which each correspond to four variants which differ in their angular offset V: in the uppermost diagram V=1 $U_1$, in the next V=0.75 $U_1$, in the third case V=0.5 $U_1$, and in the lowermost diagram V=0.25 $U_1$. FIG. 3 shows the result of a simulation for a double chain wheel with pentagonal chain wheels for a chain of the 16×45 type, i.e. the wire diameter of the chain is 16 mm and the chain pitch is $u_1$=45 mm. Plotted on the ordinate is the change in the effective chain radius Δr (in millimetres) as a function of the maximum value. The two broken lines show the radius fluctuations of the individual link chains; e.g. dashed line for the first chain strand S1 and dot-dash line for the second chain strand S2, and the continuous line gives the averaged curve therefrom; this curve is "experienced" by the load fastened to the connecting part (e.g. connecting part B1). The compensation of the polygon effect is obtained from the comparison between the amplitude of the radius fluctuation of an individual link chain and that of the averaged curve. As can be seen in FIG. 3, in the case of V=1 $U_1$ (uppermost diagram) a compensation of the polygon effect is achieved which corresponds to a reduction of the amplitude by 47%; when V=0.75 $U_1$ (second diagram) the compensation is 40%; in the third case with V=0.5 $U_1$ a compensation of 50% is achieved and when V=0.25 $U_1$ (lowermost diagram) the compensation is again 40%.

This clearly shows that the invention can achieve a considerable reduction of the so-called polygon effect; the best results can be achieved with an offset V at 0.5 $U_1$. It should be noted here that an angular offset whose value lies above the angular pitch (V>$U_1$), is equivalent for symmetry reasons to the corresponding negative value of the angular offset and also (since the effect of the angular offset is periodic about $2U_1$) to the relevant complement value in relation to the double angular pitch, i.e. symbolically:

$$V \leftrightarrow V' = 2U_1 - V \quad (1).$$

Consequently it is sufficient to consider only those values of the angular offset which lie in the range of 0° to $U_1$ (inclusively). A value at which a reduction of the polygon effect is already noticeable should be selected as the minimum value for the offset which differs from 0°. For example, for the double chain wheel of the exemplary embodiment shown, a value of 5° (or more; at the upper limit corresponding to this, up to 67°=72°−5°) already results in a reduction of the polygon effect by about 14% (or more); and an angular offset of 9° (or 63°=72°−9°) results in a reduction of about 25%.

Preferred therefore are values of the angular offset which account for at least half the angular pitch, i.e. V≥$U_1$/2; particularly preferred are values which lie at around ⅔ of $U_1$; in the exemplary embodiment shown (in which $U_1$=36°) this corresponds to a value of about 24°. On the basis of the results shown by means of FIG. 3, the inventor assumes that in general, a range of $U_1$/2≤V≤2$U_1$/3 is particularly favourable, wherein this range can be extended on both sides by about $U_1$/6 when lower requirements are imposed (therefore $U_1$/3≤V≤5$U_1$/6). Of course these ranges are equivalent to the corresponding complementary ranges which are obtained by applying the above complementary formula (1) and/or replacing the values by negative values.

During the movement of the chains about the chain drive the sling rocker performs rolling compensating movements in the form of small rotations about the load direction b (this can be seen in FIGS. 2a-2c from the small angle of orientation of the sling rocker A1 with respect to the axis of rotation d), which however have a substantially less disturbing effect on the held load than the displacement as a result of the polygon effect.

The chain wheels R11, R12 may be fabricated as separate parts, from suitable materials such as steel or plastic materials, for which fabrication methods of well-known types may be used, and then joined together, for example by welding or adhesive bonding. The two chain wheels may also be assembled to form a double chain wheel by being placed on a shaft (which may also be used for driving the chain wheel). Alternatively to this or in combination therewith, the chain wheels may be connected to one another in a torque-proof manner or rigidly by a detachable connection such as lateral pins, feather keyways, spline toothing or the like. As a variant the double chain wheel D1 may also be fabricated in one piece.

Figure 4C:
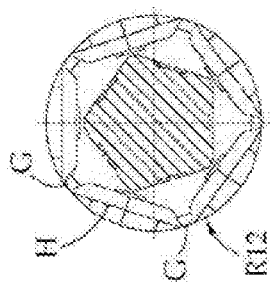
FIGS. 4a-4d show the chain drive component of FIG. 1 in a front view (FIG. 4a), two sectional views of the two chain wheels along the respective central plane (FIG. 4b, 4c) and a longitudinal sectional view (FIG. 4d)
Figure 4B:
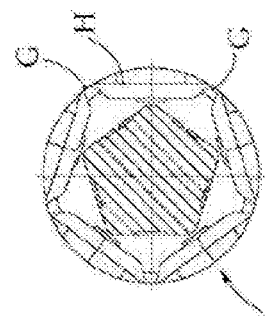
Figure 4D:
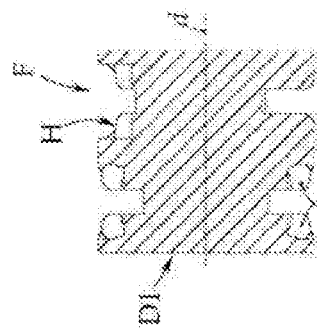
Figure 4A:
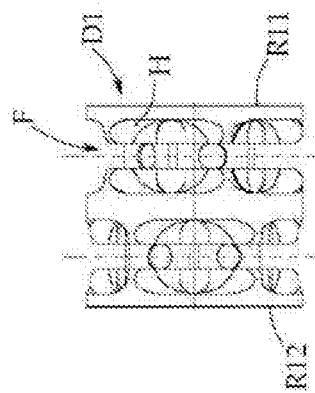

FIGS. 4a-d show further details of the chain wheels of the chain drive of FIGS. 1 and 2a-2c. Here FIG. 4a shows a front view of the chain drive (double chain wheel D1) without inserted chain links. FIGS. 4b and 4c each show a sectional view of two chain wheels along their central planes m1 or m2. FIG. 4d shows a longitudinal sectional view along a section plane through the axis of rotation d of the double chain wheel D1.

FIGS. 5a-5c show an example of a lifting gear arrangement I1 in which the double chain wheel D1 is mounted together with its pertaining shaft W1, rotatable in a housing E1 mounted on a carrier plate. FIGS. 5a-5c contain three views, namely in FIG. 5a a front view, in FIG. 5b a side view and in FIG. 5c a perspective view of the lifting gear arrangement I1. The housing E1 is mounted on the carrier plate P1, e.g. with the aid of screw bolts which fix base parts of the housing E1 on the carrier plate P1 or by means of another suitable fastening. The base part P1 is provided with a window P0, e.g. of rectangular shape, through which the two chains are guided into and out of the chain drive. The housing E1 surrounds the chain wheels R11, R12 and delimits on the inside the movement space of the link chains on the chain wheels in the radial direction. The double chain wheel D1 is mounted by the shaft W1 and its holders W11, W12 concentrically in the housing E1, enabling the wheel D1 to rotate within the housing E1 without touching it, and at the same time holding it rotatably therein. The holders W11, W12 are only implied in FIGS. 5a-5c, they are fastened to the carrier plate (not shown) and provide for a stable mounting of the shaft W1 and consequently of the double chain wheel D1 in the lifting gear arrangement in a rotatable manner about the axis of rotation d.

Figure 6C:
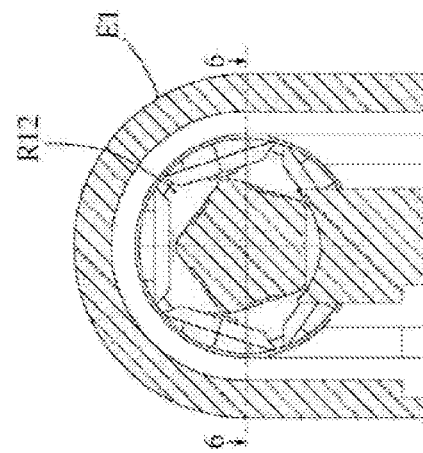
FIGS. 6a-6d show the chain drive of FIG. 4 together with the housing surrounding the chain wheels in a front view (FIG. 6a), in sectional views along the central plane of the two chain wheels in each case (FIG. 6b, 6c), and a longitudinal sectional view (FIG. 6d)
Figure 6B:
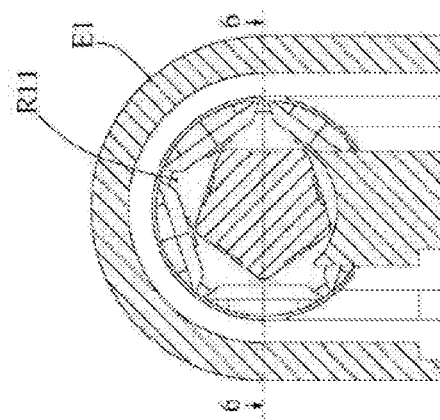
Figure 6D:
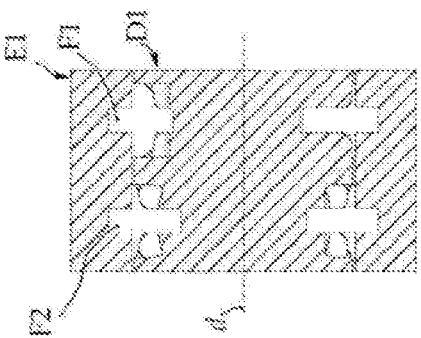
Figure 6A:
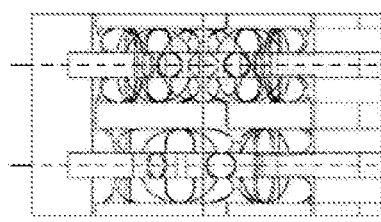

FIGS. 6a-6d show a simplified diagram of the lifting gear arrangement, namely merely the chain drive together with the housing E1 (the base parts of the housing are omitted in FIGS. 6a-6d for the sake of clarity). Here FIG. 6a shows a front view without inserted chain links. FIGS. 6b and 6c each show a sectional view along the central planes m1 or m2 of the two chain wheels. FIG. 6d shows a longitudinal sectional view along a "horizontal" section plane 6-6 through the axis of rotation d of the double chain wheel D1.

As can be seen in the sectional view of FIG. 6d in particular, the housing includes two adjacent grooves F1, F2 on the inside, which guide vertical links of the link chains running on the chain wheels. An interior part K1, also referred to as stripper, terminates the chain drive on the output side and guides the chain sections during entry into the chain drive and in particular during release ("stripping") of the chains from the chain wheels and leaving the chain drive. The inner part K1 is held on the inner edges of the window P0 of the carrier plate P1 on which it is supported.

The following exemplary embodiments shown in FIGS. 7-19 contain various configurations of the sling device according to the invention, showing, for the sake of clarity in each case, only the chain drive without housing or lifting gear arrangement.

Figure 7:
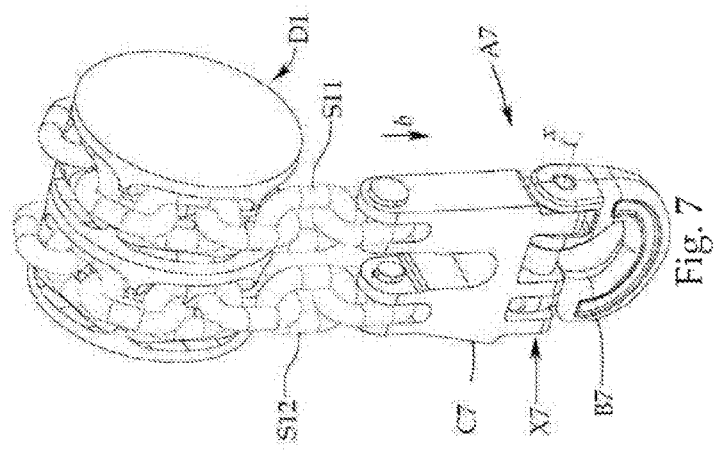
FIG. 7 shows a chain drive system with a sling according to a second exemplary embodiment.
Figure 9:
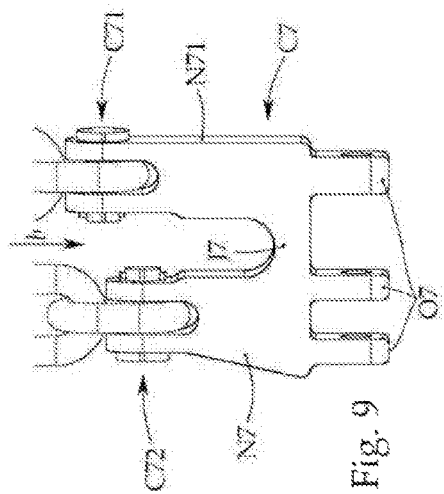
FIG. 9 shows a front view of the sling of FIG. 7.
Figure 8C:
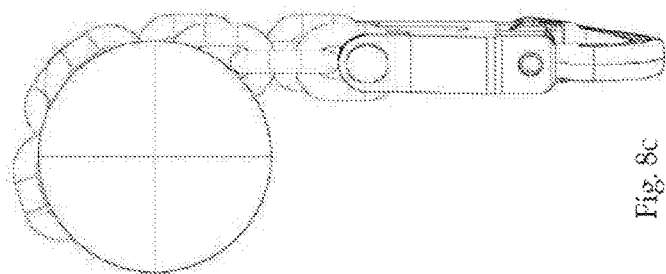
FIGS. 8a-8c show the chain drive system of FIG. 7 in a plan view (FIG. 8a), a front view (FIG. 8b) and a side view (FIG. 8c)
Figure 8B:
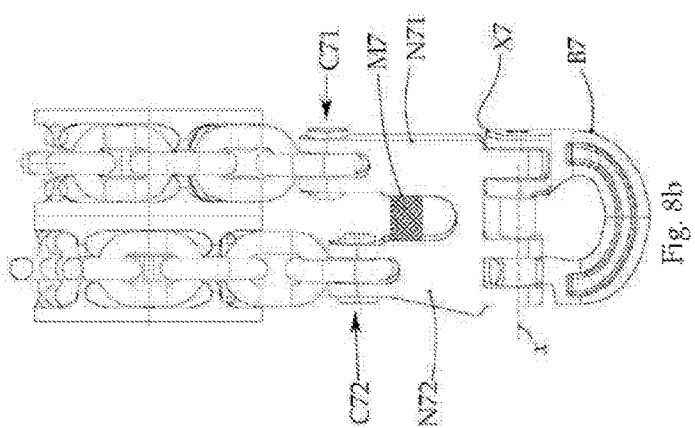
Figure 8A:
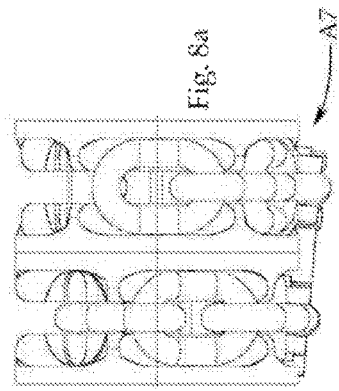

With reference to FIGS. 7 to 9 according to a second exemplary embodiment, the sling may be fitted with a sling bracket on the side of the connecting part. FIG. 7 shows a perspective view of a chain drive system according to the second exemplary embodiment together with two chain strands S11, S12 of a chain hoist guided thereon, at the ends of which also a sling is mounted in the form of a sling component A1. FIGS. 8a-c show the chain drive system in three views (FIGS. 8a-8c), namely in a plan view (FIG. 8a), a front view (FIG. 8b) and a side view (FIG. 8c; viewing direction parallel to the axis of rotation d of the chain wheel and approximately parallel to the hinge axis x of the sling component A1). FIG. 9 shows the sling of FIG. 7 in a front view.

The sling component A7, also referred to as sling rocker A7, contains a body C7 and a sling bracket B7 connected in an articulated manner thereon. The body C7 is configured with a U shape which has two legs N71, N72 at the ends of which respectively one of two connection portions C71, C72 is provided. Each connection portion C71, C72 is configured as a fork connection in the intermediate space of which an end link of a chain strand is inserted and fastened with a bolt which is, for example, secured with a split pin.

With reference to FIG. 9, the legs N71, N72 preferably have a small cross-section, which allows an elastic deformation of the body C7 and consequently permits a spring suspension and resulting reduction in the rolling movement about the load direction b. In addition or alternatively to this, the connecting web J7 between the legs may be realized with a small cross-section in order to also allow an elastic deformation (in particular torsion) in order to compensate any movement of the two chains transversely to the load direction.

As can be seen in FIG. 8b, an intermediate element M7 may be arranged between the legs N71, N72 which serves as a damping and/or resilient element in order to additionally compensate the movement of the two chains transversely to the load direction. The intermediate element preferably comprises a deformable material for damping vibrations between chains attached at the connection portions. The intermediate element M7 may, for example, be configured as a block of elastomeric material and/or as a hydraulic damper element.

Again with reference to FIG. 9, hinge parts O7 are provided on the side ("underside") of the body C7 facing away from the connection portions C71, C72, which form a hinge-like articulation with corresponding hinge parts of the bracket B7. Thanks to the hinge articulation X7 thus formed (FIG. 8b), the bracket B7 is pivotable about an axis x which runs transversely to the load direction b and substantially in that plane in which the link chains run (therefore substantially parallel to the axis of rotation d of the double chain wheel D1). The bracket B7 is fastened to the body C7 with the aid of a hinge pin which is inserted along the axis x. The direction of extension of the bolts of the connection portions C71, C72 is preferably parallel to the orientation of the hinge axis x.

FIGS. 10 to 12 show another exemplary embodiment which differs from the previous one by a different orientation of the sling bracket B9. FIG. 10 shows a perspective view of a chain drive system according to this exemplary embodiment. FIGS. 11a-11c show the chain drive system in three views (similarly to FIGS. 8a-8c), namely in a plan view (FIG. 11a), a front view (FIG. 11b) and a side view (FIG. 11c). FIG. 12 shows the sling rocker A9 of FIG. 10 in a front view.

With reference to FIGS. 11a-11c and in particular FIG. 12, the sling rocker A9 comprises a body C9 to which a sling bracket B9 is connected in an articulated manner; the sling bracket B9 has the same design as the sling bracket B7, however at a different orientation with regard to the chain hoist of this exemplary embodiment. The body C9 is again configured with a U shape with two legs N91, N92, at whose ends two respective connection portions C91, C92 are provided. Each connection portion C91, C92 is configured as a fork connection; in the intermediate space thereof an end link of a chain strand will be inserted and fastened with a bolt which is secured with a split pin, for example.

With reference to FIG. 12, the legs N91, N92 preferably have a small cross-section which allows an elastic deformation of the body C9 and as a result, permits a spring suspension and resulting reduction in the rolling and compensating movements about the load direction b. In addition, the connecting region J9 between the legs may be realized having a small cross-section in order to also allow an elastic deformation (in particular torsion) in order to compensate for any movement of the two chains transversely to the load direction.

As can be seen in FIG. 11b, an intermediate element M9 may be arranged between the legs N91, N92 which serves as a damping and/or resilient element in order to additionally compensate for the movement the two chains transversely to the load direction. The intermediate element preferably comprises a deformable material for damping vibrations between chains attached at the connection portions. The intermediate element M9 may, for example, be configured as a block of an elastomeric material and/or as a hydraulic damping element.

Again with reference to FIG. 12, hinge parts O9 are provided on the side ("underside") of the body C9 facing away from the connection portions C91, C92; they realize a hinge-like articulation with corresponding hinge parts of the bracket B9. Thanks to the hinge articulation Y9 thus formed (FIG. 11b), the bracket B9 is pivotable about an axis x which is transverse to the load direction b and substantially transverse to the plane in which the link chains run (therefore substantially perpendicular to the orientation of the axis of rotation d). The bracket B9 is fastened to the body C9 by means of a hinge pin which is inserted along the axis y. The running direction of the bolts of the connection portions C91, C92 is preferably parallel to the orientation of the hinge axis y.

Figure 13:
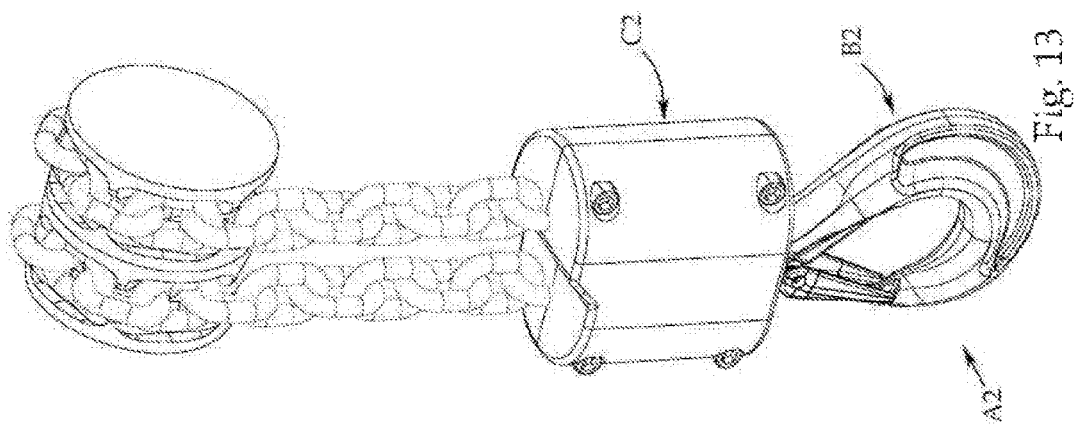
FIG. 13 shows a chain drive system with a sling with a load hook according to another exemplary embodiment.
Figure 14C:
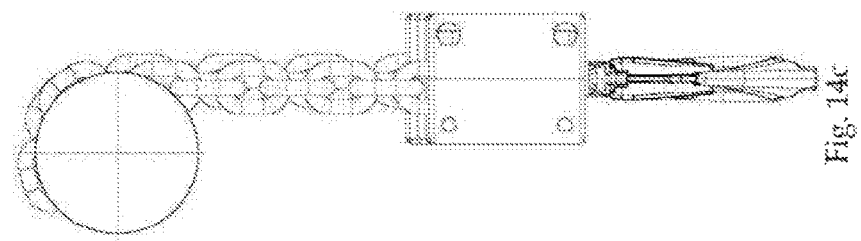
FIG. 14 shows the chain drive system of FIG. 13 in a plan view (FIG. 14a), a front view (FIG. 14b) and a side view (FIG. 14c)
Figure 14B:
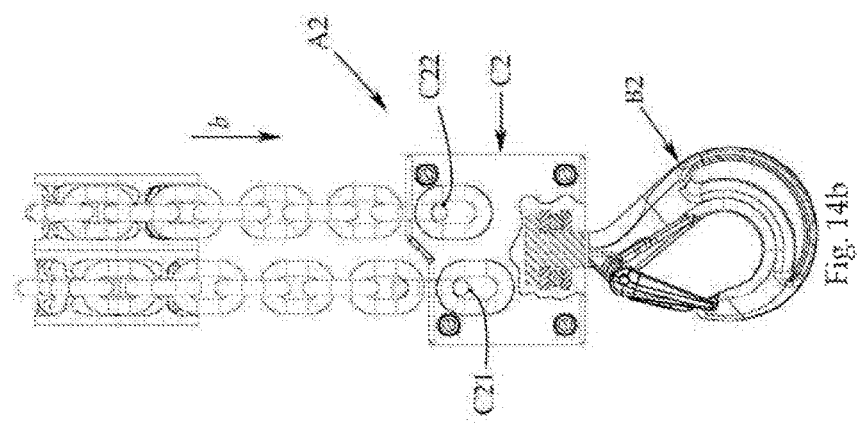
Figure 14A:
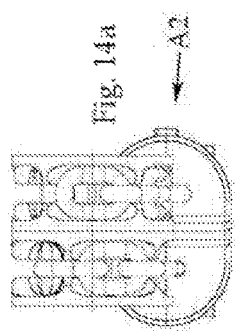

FIGS. 13 and 14a-14c show an exemplary embodiment where the sling is configured as a sling component A2 with a load hook B2. FIG. 13 shows a perspective view of a chain drive system according to this exemplary embodiment. FIGS. 14a-14c show the chain drive system in three views (similarly to FIGS. 8a-8c), namely in a plan view (FIG. 14a), a front view (FIG. 14b) and a side view (FIG. 14c).

The sling component A2 is formed by a body C2 which has a can-like shape and which has connection portions C21, C22 provided in the "upper" region thereof. By means of these connection portions C21, C22 which are provided inside the body, respective end links of the chain strands are inserted and fastened with e.g. a bolt.

The load hook B2 is mounted in the "underside" of the body of the sling component C2 preferably rotatably about an axis parallel to the load direction b. In one variant however, the load hook B2 may be attached in a torque-proof manner to the body C2.

A double chain wheel is used in the exemplary embodiments presented so far, where the two chain wheels R11, R12 are joined together so as to be immediately adjacent without any spacing. Depending on the application, the two chain wheels may be spaced apart, as shown for example in FIGS. 16a and 17a-e. In the double chain wheel D6 two chain wheels R61, R62 are connected to one another in a torque-proof connection with a pre-selected angular offset V by a shaft W6 (with a smaller diameter than the chain wheels). The connecting shaft W6 preferably connects the two chain wheels R61, R62 directly to one another, in particular without interposed transmission, bearing or drive components.

Such a double chain wheel D6 with spaced-apart chain wheels is suitable for use in embodiments which correspond to the previously described exemplary embodiments, but then in the slings the spacing of the two connection portions should be increased accordingly, which the skilled person can adapt readily.

Instead of a sling, a chain deflecting wheel may also be used, as shown in the following exemplary embodiment. A configuration of the chain drive component with spaced-apart chain wheels is particularly expedient for the use of a chain deflecting wheel.

Figure 17C:
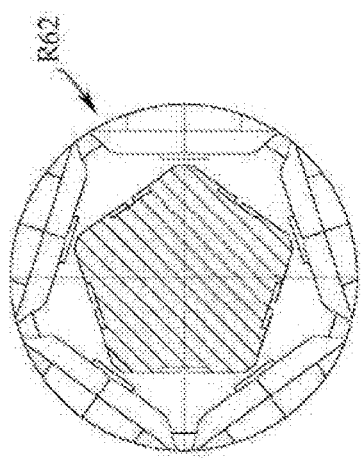
FIGS. 17a-17e show the chain drive component of FIG. 15 in a front view (FIG. 17a), two sectional views of the two chain wheels along the respective central plane (FIG. 17b, 17c), a longitudinal sectional view (FIG. 17d), and a perspective view (FIG. 17e)
Figure 17B:
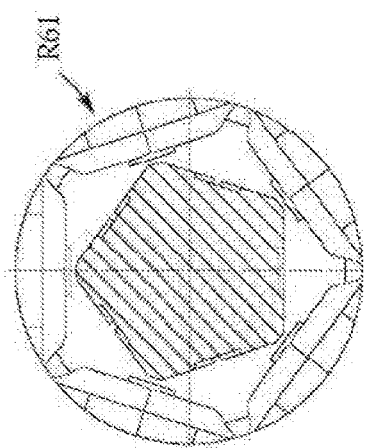
Figure 17E:
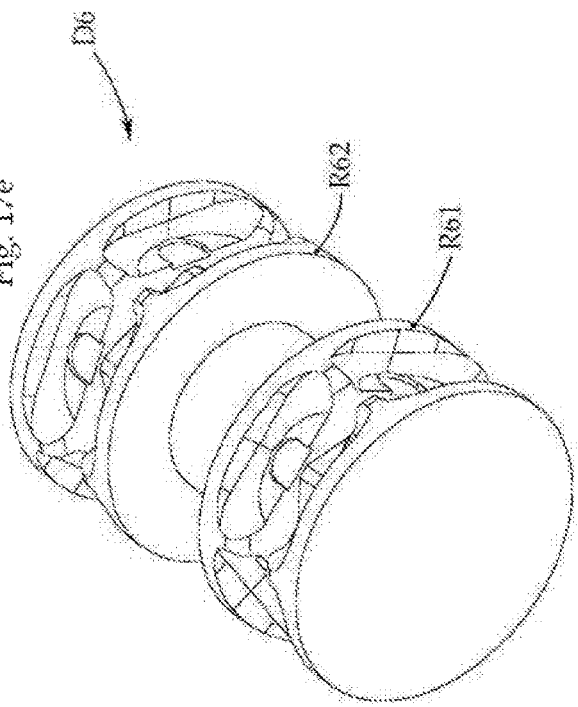
Figure 17A:
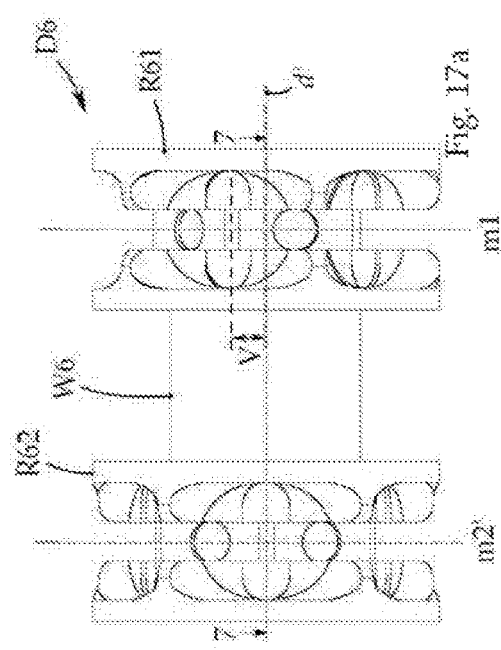
Figure 17D:
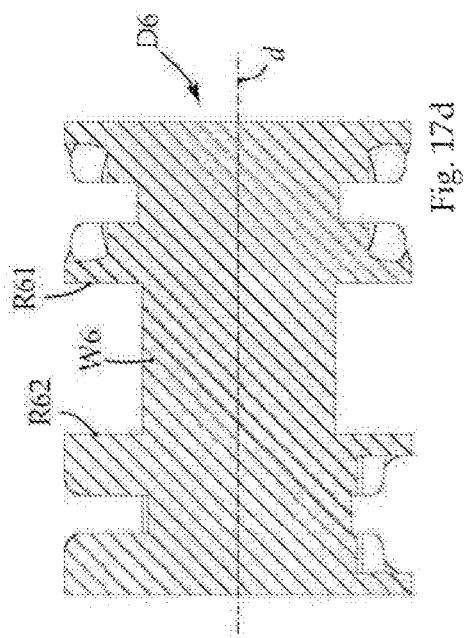

With reference to FIGS. 15 to 17a-17e a chain hoist is shown in which the two chain strands S61, S62, which are guided on the double chain wheel D6, belong to the same link chain; this is guided over a chain deflecting wheel Q6. FIG. 15 shows the chain drive system according to this exemplary embodiment; FIGS. 16a-16c shows the chain drive system in three views (similarly to FIGS. 8a-8c), namely in a plan view (FIG. 16a), a front view (FIG. 16b) and a side view (FIG. 16c). In FIGS. 17a-17e the double chain wheel D6 is shown in several views and specifically FIG. 17a shows a front side without inserted chain links; FIGS. 17b and 17c show a sectional view of one of the two chain wheels R61, R62 along the respective central plane m1' or m2'; FIG. 17d is a longitudinal sectional view along a section plane 7-7 along the axis of rotation d' of the double chain wheel D6; and FIG. 17e is a perspective view of the double chain wheel D6.

In the chain hoist of this exemplary embodiment the link chain is guided such that a first section, which corresponds to the first chain strand S61, runs over the first chain wheel R61 of the chain drive component realized as double chain wheel D6, then is guided at the end of the load direction b over the chain deflecting wheel Q6 and runs with a second section which corresponds to the second chain strand S62, back again over the second chain wheel R62 of the double chain wheel D6.

The size of the spacing of the two chain wheels R61 and R62 with respect to one another (that is the length of the shaft W6 measured along the axis of rotation d') may, for example and advantageously, be selected such that the spacing of the two central planes m1' and m2' with respect to one another corresponds to the average swing diameter of the chain guided around the chain deflecting wheel Q6.

The chain deflecting wheel Q6 may have a central axial bore Y6 along its axis of rotation or may be configured with a shaft preferably protruding on both sides (not shown). The axis of rotation of the chain deflecting wheel Q6 or the axial bore Y6 will roll slightly as a result of the movement of the chain strands but is oriented on average substantially perpendicular to the alignment of the axis of rotation d' of the double chain wheel D6. The axis of the double chain wheel D6 may be configured for fastening a load, for example with the aid of a rod (not shown) or the like, inserted through the axial bore Y6.

Figure 19:
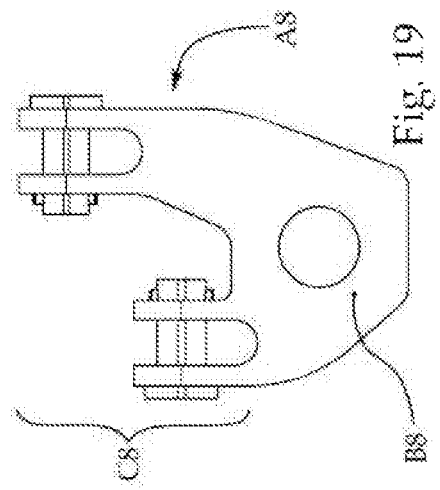
FIG. 19 shows a view of the relevant sling component of the system of FIGS. 18a-18b.
Figure 18A:
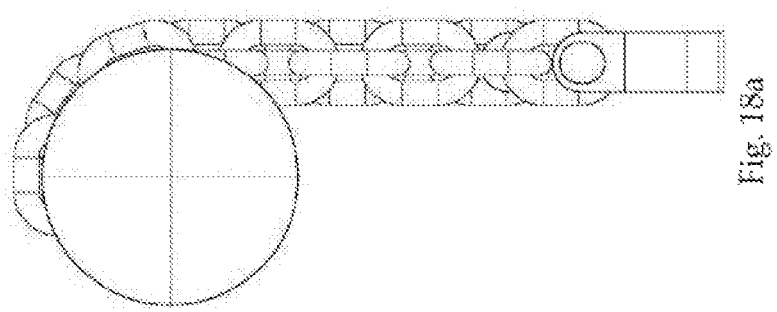
FIGS. 18a-18b show another chain drive system in a side view (FIG. 18a) and a front view (FIG. 18b)
Figure 18B:
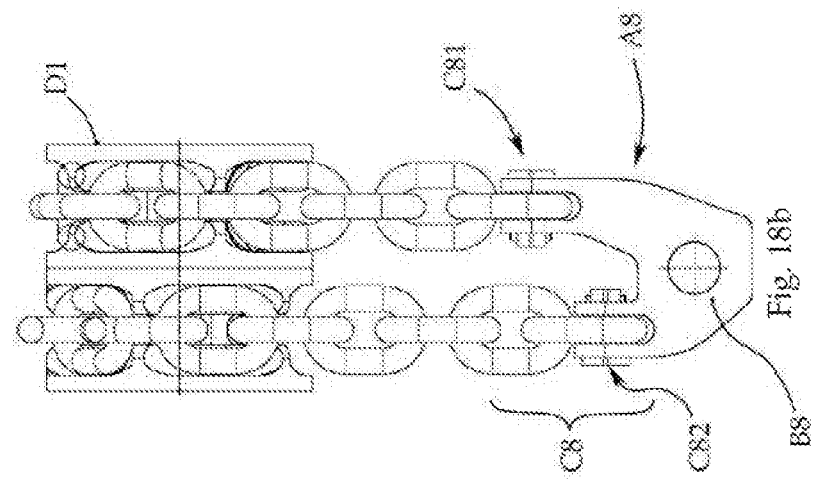

FIGS. 18a-18b and 19 show a further exemplary embodiment which is similar to the exemplary embodiment of FIGS. 1 and 2a-2c, but contains a one-piece sling component A8. FIGS. 18a-18b show the chain drive system according to this exemplary embodiment in a side view (FIG. 18a) and a front view (FIG. 18b); FIG. 19 shows the sling component A8 in a front view.

The sling component A8 ("sling rocker") comprises a connecting section C8 and a connecting part B8. The connecting section C8 comprises two connection portions C81, C82 which each have a pair of mutually opposite holes through which a bolt can be inserted, in this exemplary embodiment along a direction parallel to the axis of rotation d. The connecting part B8 contains an eye, into whose opening a hook will be inserted or another sling means for fastening the load will be attached. Alternatively or in combination with the eye, a threaded hole (not shown) may also be provided, i.e. an opening with an internal thread. Otherwise that explained for the sling rocker A1 with reference to FIGS. 1 and 2a-2c applies accordingly for the sling component A8.

It will be clear that the person skilled in the art can modify the invention and adapt it to given requirements based on the depicted embodiments and the description. The technical structure of the invention is therefore not restricted to the depicted embodiments; on the contrary, the invention extends to the entire scope of protection which is obtained from the following claims.

That which is claimed is:

1. A chain drive (D1, D6) for a chain hoist with two link chain strands (S11, S12), the chain drive comprising:
   two chain wheels (R11, R12; R61, R62) which are arranged adjacent on a shaft of the chain drive and in a torque-proof connection to one another,
   wherein each of the two chain wheels is configured for guiding a section of a respective link chain strand having alternately horizontal (L) and vertical (T) links, by comprising pockets (H) for accommodating horizontal links and a groove (F) extending in the circumferential direction for accommodating vertical links,
   wherein a first wheel (R11, R61) of the chain wheels has a fixed angular offset (V) with respect to a second wheel (R12, R62) of the chain wheels, said fixed angular offset being smaller than an angular pitch ($U_1$) between two successive chain links of the first wheel, and
   wherein the first wheel has a first radius, and the second wheel has a second radius which is equal to the first radius.

2. The chain drive according to claim 1, wherein the angular offset (V) is not smaller than half an angular pitch.

3. The chain drive according to claim 1, wherein the angular offset V is approximately $U_1/3 \leq V \leq 5U_1/6$ wherein $U_1$ designates the angular pitch.

4. The chain drive according to claim 1, wherein the angular offset V is approximately $U_1/2 \leq V \leq 2U_1/3$, wherein $U_1$ designates the angular pitch.

5. The chain drive according to claim 1, further comprising a housing (E1) which surrounds the chain wheels and on its inside delimits the movement space of the chain links on the chain wheels in the radial direction.

6. The chain drive according to claim 5, wherein the housing comprises, on its inside, two grooves (F1, F2) which are adjacent and in which vertical links of the link chain strands running on the chain wheels are guided.

7. The chain drive according to claim 1, wherein the chain wheels (R61, R62) are spaced apart from one another on the shaft (W6).

8. A chain drive system for a chain hoist with double link chain, comprising the chain drive (D1, D6) according to claim 7, and a chain deflecting wheel (Q6) configured as a chain wheel whose axis (Y6) is provided for fastening a load.

9. A chain drive system for a chain hoist with two link chain strands or double link chain, comprising:
a chain drive (D1, D6) according to claim 1; and
a sling device for a chain suspension of two link chain strands running parallel, wherein the sling device (A1) is configured with regard to an intended load direction (b) and comprises, at one end, a connecting part (B1) for attaching a load and, at an opposite end (C) thereto when viewed in the load direction, two connection portions (C11, C12) for respective end links of the link chain strands, wherein the connection portions are arranged offset with respect to one another along the load direction with a linear offset (v), said linear offset being smaller than a chain pitch (u1) along the load direction (b).

10. A sling device for a chain suspension of two link chain strands running parallel, wherein the sling device (A1) is configured with regard to an intended load direction (b) and comprises, at one end, a connecting part (B1) for attaching a load and, at an opposite end (C) thereto when viewed in the intended load direction, two connection portions (C11, C12) each of which is configured to be directly, and simultaneously with the other, secured to an end link of a respective one of the two link chain strands, wherein the connection portions are arranged offset with respect to one another along the intended load direction with a linear offset (v) when the intended load direction is parallel to a direction in which the two link chain strands extend, said linear offset being smaller than a chain pitch ($u_1$) along the intended load direction (b).

11. The sling device according to claim 10, wherein the connecting part comprises a sling bracket (B7, B9) that is pivotable about an axis (x,y) transversely to the intended load direction.

12. The sling device according to claim 11, wherein said axis lies in the plane in which the link chain strands extend or transversely to said plane.

13. The sling device according to claim 10, wherein the connecting part comprises an eye (B1, B8) which is oriented transversely to the intended load direction (b).

14. The sling device according to claim 13, wherein the eye is oriented transversely to the plane in which the link chain strands run.

15. The sling device according to claim 10, wherein the connecting part has an opening with an internal thread which is oriented transversely to the intended load direction.

16. The sling device according to claim 15, wherein the opening with an internal thread which is oriented transversely to the plane in which the link chain strands run.

17. The sling device according to claim 10, wherein the connecting part comprises a load hook.

18. The sling device according to claim 17, wherein the load hook is mounted rotatably about an axis parallel to the intended load direction (b) on the sling device.

19. A sling device for a chain suspension of two link chain strands running parallel, wherein the sling device (A1) is configured with regard to an intended load direction (b) and comprises, at one end, a connecting part (B1) for attaching a load and, at an opposite end (C) thereto when viewed in the load direction, two connection portions (C11, C12) configured for attaching respective end links of the link chain strands, wherein the connection portions are arranged offset with respect to one another along the load direction with a linear offset (v), said linear offset being smaller than a chain pitch ($u_1$) along the load direction (b), wherein each connection portion (C71, C72;
C91, C92) is arranged on a leg (N71, N72; N91, N92) extending in the load direction or at a small angle thereto, wherein an intermediate element (M7, M9) of deformable material is arranged between the legs for damping vibrations between chains attached at the connection portions.

20. The sling device according to claim 19, wherein the intermediate element (M7, M9) is configured as a block of elastomeric material and/or as a hydraulic damper element.

* * * * *